United States Patent
Valentin et al.

(10) Patent No.: US 8,274,730 B2
(45) Date of Patent: Sep. 25, 2012

(54) GLASS TYPE ELECTROCHEMICAL/ELECTRICALLY CONTROLLABLE DEVICE WITH VARIABLE OPTICAL AND/OR ENERGETIC CHARACTERISTIC

(75) Inventors: Emmanuel Valentin, Le Plessis Trevise (FR); Xavier Fanton, Aulnay Sous Bois (FR); Samuel Dubrenat, Paris (FR); Jean-Christophe Giron, Eupen (BE)

(73) Assignee: Saint-Gobain Glass France, Courbevoie (FR)

( * ) Notice: Subject to any disclaimer, the term of this patent is extended or adjusted under 35 U.S.C. 154(b) by 119 days.

(21) Appl. No.: 12/967,938

(22) Filed: Dec. 14, 2010

(65) Prior Publication Data

US 2011/0080630 A1 Apr. 7, 2011

Related U.S. Application Data

(63) Continuation of application No. 12/374,050, filed as application No. PCT/FR2007/051675 on Jul. 17, 2007, now Pat. No. 7,894,119.

(30) Foreign Application Priority Data

Jul. 21, 2006 (FR) ...................................... 06 53068

(51) Int. Cl.
*G02F 1/153* (2006.01)
*G02F 1/15* (2006.01)

(52) U.S. Cl. ........................................ 359/275; 359/265
(58) Field of Classification Search ............. 204/192.12; 359/265, 275; 427/126.4, 126.6
See application file for complete search history.

(56) References Cited

U.S. PATENT DOCUMENTS

| | | | |
|---|---|---|---|
| 6,337,758 B1 | 1/2002 | Beteille et al. | |
| 7,652,812 B2 | 1/2010 | Mahe et al. | |
| 7,777,933 B2 | 8/2010 | Piroux et al. | |
| 7,894,120 B2 * | 2/2011 | Valentin et al. | 359/275 |
| 2009/0323157 A1 | 12/2009 | Valentin et al. | |
| 2010/0132988 A1 | 6/2010 | Valentin et al. | |

FOREIGN PATENT DOCUMENTS

| | | |
|---|---|---|
| FR | 2 781 084 | 1/2000 |
| FR | 2 873 460 | 1/2006 |
| JP | 57 027240 | 2/1982 |
| JP | 61 277 927 | 12/1986 |

\* cited by examiner

*Primary Examiner* — David N Spector
(74) *Attorney, Agent, or Firm* — Oblon, Spivak, McClelland, Maier & Neustadt, L.L.P.

(57) ABSTRACT

Electrochemical/electrically controllable device having variable optical and/or energetic properties, including a first carrier substrate provided with an electrically conductive layer associated with a first stack of electrically active layers and a second carrier substrate provided with an electrically conductive layer associated with a second stack of electrically active layers, wherein the first and second stacks each function optically in series on at least a portion of their surface and are separated by an electrically insulating means, which is a gas, or is a vacuum.

15 Claims, 1 Drawing Sheet

Figure 1:
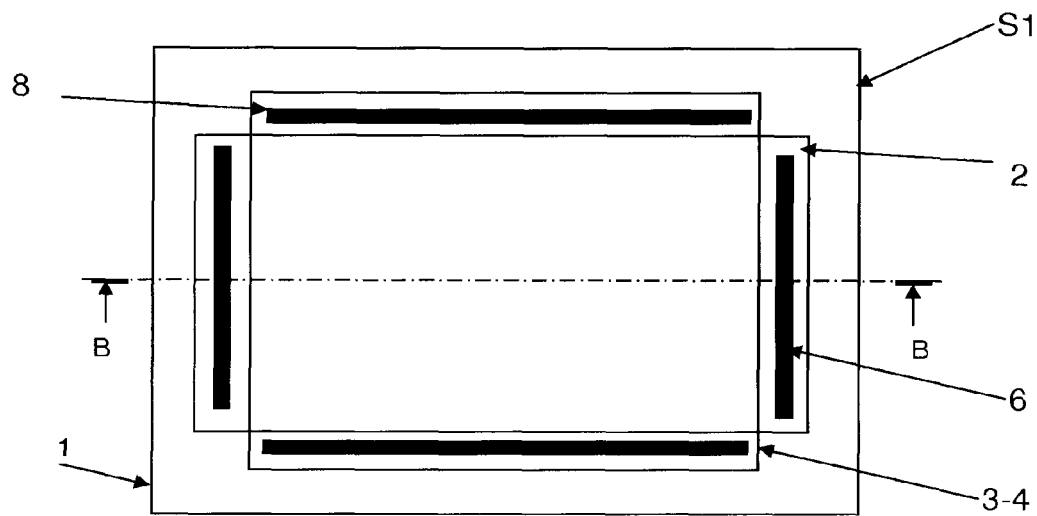

GLASS TYPE ELECTROCHEMICAL/ELECTRICALLY CONTROLLABLE DEVICE WITH VARIABLE OPTICAL AND/OR ENERGETIC CHARACTERISTIC

The present application is a continuation application of U.S. Ser. No. 12/374,050, filed Jan. 16, 2009, the entire content of which are incorporated herein by reference. U.S. Ser. No. 12/374,050 is the National Stage PCT/FR07/51675, filed Jul. 17, 2007, and claims priority to French Application No. 0653068, filed Jul. 21, 2006. The present invention relates to an electrochemical and/or electrically controllable device of the glazing type which has variable optical and/or energetic properties.

Specifically, there is nowadays an increased demand for so-called "intelligent" glazing which can adapt to the users' requirements.

As regards "intelligent" glazing, this may involve controlling the delivery of sunlight through glazing fitted on the exterior of buildings or vehicles such as automobiles, trains or aircraft (for example a window). The purpose is to be able to limit excessive heating inside the rooms/cockpits, but only in case of strong sunshine.

It may also involve controlling the degree of vision through glazing, particularly in order to darken it, render it diffusing or prevent any vision when so desired. This may relate to glazing fitted as interior partitions inside rooms, trains, aircraft or fitted as automobile side windows. It also relates to mirrors used as wing mirrors, in order to avoid the driver being locally dazzled, or signaling panels so that messages appear when this is necessary or intermittently in order to attract attention better.

Glazing, which can be rendered diffusing at will, may be used when so desired as projection screens.

As a variant, it may involve generation of light by the glazing in order to control the level of luminosity or the color generated.

There are various electrically controllable systems allowing these types of aspect/thermal property modifications.

In order to modulate the optical transmission or optical absorption by glazing, there are so-called viologen systems such as those described in U.S. Pat. No. 5,239,406 and EP-612 826.

In order to modulate the optical transmission and/or thermal transmission of glazing, there are also so-called electrochromic systems. As is known, these generally comprise two electrochromic material layers separated by an electrolyte layer and framed by two electrically conductive layers, the latter being associated with current feeds connected to an electricity supply.

Each of these electrochromic material layers can reversibly insert cations and electrons, the modification of their oxidation state due to these insertions/deinsertions leading to a change in its optical and/or thermal properties. In particular, their absorption and/or their reflection at visible and/or infrared wavelengths can be modified.

It is customary to divide electrochromic systems into three categories:
  that in which the electrolyte is in the form of a polymer or a gel; for example, a polymer with protonic conduction such as those described in EP-253 713 or EP-670 346, or a polymer with lithium ion conduction such as those described in EP-382 623, EP-518 754 and EP-532 408; the other layers of the system are generally of inorganic nature,
  that in which the electrolyte is an inorganic layer. This category is often referred to by the term "all solid" system, and examples of it can be found in EP-867 752, EP-831 360, patents WO 00/57243 and WO 00/71777.
  that in which all the layers are based on polymers, which category is often referred to by the term "all polymer" system.

The present invention concerns "all solid" electrochromics.

A common feature of all these systems is the need to be equipped with current feeds, which supply electrically conductive layers on either side of the active layer or various active layers of the system.

These current feeds make it possible to apply a voltage and pass a current through the stack, the flow of current being intended to ensure switching from a colored state to an uncolored state, and vice versa.

It will be understood that the change from one state to another takes place either by darkening or by brightening the glazing driven in this way. The current trend is to have systems which produce rapid and homogeneous effects under the influence of a supply, and in which the contrast between the 2 states (uncolored/colored) is as high as possible so as to achieve a virtually opaque system in the colored state, the contrast being defined as the ratio between the optical transmission value (OT) in the uncolored state to the value of the optical transmission in the colored state.

In order to do this, various solutions are known in the prior art:
increasing the quantity of charge or the voltage level at the terminals of the current feeds, the major drawback of this solution residing in the fact that it generally leads to inferior robustness of the system,
using layers which are optically more active, widening the achievable ranges of optical transmission. The development of such layers may require considerable research work with modification or replacement of the existing materials,
juxtaposing at least 2 complete systems assembled in a multiple glazing system (reference may be made to U.S. Pat. No. 5,076,673). This solution minimizes the likelihood that a defect present on one of the systems will lie next to a defect present on the other system. The major drawback of this solution resides in the fact that a supply is needed for each of the systems, which impacts on the cost price; furthermore, juxtaposing the systems entails an increased weight of the overall structure, in view of the fact that at least 4 substrates are needed for the assembly. This multiple glazing assembly, in particular double glazing, necessarily increases the number of optical interfaces and will therefore lead to a reduction of the optical transmission in the uncolored state. This double glazing assembly of the "building" type is not applicable to the automotive field. It may be noted that the laminated assembly which is customary in the automotive field is possible only with substantially flat substrates and with a limited number of substrates (2 or 3). It is virtually impossible with highly curved substrates, especially when there are more than 2 or even 3 of them, and it generally leads to risks of optical distortion.

It is therefore an object of the present invention to surpass the solutions of the prior art by providing a system which can be driven by a single supply and whose operational performance is at least equal to that of 2 juxtaposed systems.

The invention relates to an electrochemical/electrically controllable device having variable optical and/or energetic properties, comprising a first carrier substrate provided with an electrically conductive layer associated with a first stack of electrically active layers and a second carrier substrate provided with an electrically conductive layer associated with a second stack of electrically active layers, characterized in that the first and second stacks each function optically in series on at least a portion of their surface and are separated by an electrically insulating means which is selected from the family of organic materials, in particular a laminating insert, or inorganic materials, in particular a gas, or is a vacuum.

By virtue of the presence of an insulating means between the two active stacks, it is possible to obtain a system having a high degree of darkening at low cost.

In preferred embodiments of the invention, one and/or other of the following provisions may optionally be employed:

If a laminating insert is employed in the latter particular embodiment, it both joins the assembly together and provides the means for electrical connection to some of the electrically conductive layers of the active stacks, the first and second stacks are electrically supplied from the same supply,
the first and second stacks are electrically supplied in series,
the first and second stacks are electrically supplied in parallel,
the electrically insulating means is a laminating insert, each of the faces of the laminating insert being associated with an electrically conductive layer associated respectively with the first and the second stacks,
the first stack and the second stack are "all solid" electrochromic stacks with a TC1/EC1/EL/EC2/TC2 structure,
the layer EL with an electrolyte function comprises at least one layer based on a material selected from tantalum oxide, tungsten oxide, molybdenum oxide, antimony oxide, niobium oxide, chromium oxide, cobalt oxide, titanium oxide, tin oxide, nickel oxide, oxide of zinc optionally alloyed with aluminum, zirconium oxide, aluminum oxide, oxide of silicon optionally alloyed with aluminum, silicon nitride optionally alloyed with aluminum or boron, boron nitride, aluminum nitride, oxide of vanadium optionally alloyed with aluminum, oxide of tin and zinc, at least one of these oxides optionally being hydrogenated or nitrided,
each electrically active layer EC1 or EC2 comprises at least one of the following compounds: oxide of tungsten W, niobium Nb, tin Sn, bismuth Bi, vanadium V, nickel Ni, iridium Ir, antimony Sb, tantalum Ta, individually or as a mixture, and optionally comprising an additional metal such as titanium, rhenium, cobalt,
the electrically conductive layer TC1 or TC2 is of the metallic type or of the TCO (transparent conductive oxide) type made of $In_2O_3$:Sn (ITO), $SnO_2$:F, ZnO:Al, or is a multiple layer of the TCO/metal/TCO type, this metal being selected in particular from silver, gold, platinum, copper, or a multiple layer of the NiCr/metal/NiCr type, the metal likewise being selected from silver, gold, platinum, copper,
each of the faces of the laminating insert is associated with at least one electrically conductive layer comprising a conductive strip and/or conductive wires,
the contrast values obtained lie between 9 and 10 000, and preferably between 15 and 4000.

According to another aspect of the invention, it relates to electrochromic glazing which is characterized in that it comprises the electrochromic device as described above, having in particular a variable optical and/or energetic transmission and/or reflection, with the substrate or at least a part of the transparent or partially transparent substrate(s) made of plastic, preferably assembled as multiple and/or laminated glazing, or as double glazing.

According to yet another aspect of the invention, it relates to a method for fabricating the electrochemical device as described above, in which at least one of the layers of the electrochemical device is deposited by a technique implying a vacuum, such as cathodic sputtering optionally assisted with a magnetic field, by thermal evaporation or evaporation assisted with an electron beam, by laser ablation, by CVD optionally assisted with a plasma or with microwaves, or by an atmospheric pressure technique, in particular by depositing layers using sol-gel synthesis, in particular of the dip type, spray coating or roller coating.

Lastly, according to yet another aspect of the invention, it relates to the use of the glazing mentioned above as glazing for buildings, glazing for automobiles, glazing for industrial or public transport railroad, maritime, aviation vehicles, in particular windows, wing mirrors, mirrors, display and monitor, shutter for image acquisition devices.

In the context of the invention, the term "lower" electrically conductive layer is intended to mean the electrically conductive layer which lies closer to the carrier substrate taken as a reference, on which at least some of the active layers are deposited (for example all the active layers in an "all solid" electrochromic system). The "upper" electrically conductive layer is the one deposited on the other side.

The electrically conductive layer remains transparent in the thickness ranges mentioned below, that is to say it exhibits low optical absorption in the visible range. Nevertheless, it is not unfeasible to have much thicker layers (particularly in the case when the electrically active system of the electrochromic type functions in reflection rather than in transmission) or thinner layers (particularly when they are associated with another type of conductive layer, for example metallic, in the electrically conductive layer). As mentioned above, the invention may be applied to various types of electrochemical or electrically controllable systems. It more particularly concerns electrochromic systems, in particular ones which are "all solid".

The electrochromic systems or glazing to which the invention may be applied are described in the patents cited above. They may comprise at least two carrier substrates containing stacks between them, which form active systems and each successively comprise at least one first electrically conductive layer connected to a current feed, at least one electrochemically active layer capable of reversibly inserting ions such as $Li^+$, $OH^-$ respectively of the anodic or cathodic electrochromic material type, an electrolyte layer, at least one second electrochemically active layer capable of reversibly inserting ions such as $H^+$, $Li^+$, $OH^-$ respectively of the cathodic or anodic electrochromic material type, and a second electrically conductive layer connected to a current feed (the term "layer" is to be understood as meaning a single layer or a stack of a plurality of continuous or discontinuous layers).

The invention also relates to the incorporation of the electrochemical devices described in the preamble of the present application in glazing, which functions in reflection (mirror) or in transmission. The term "glazing" is to be interpreted in the broad sense, and covers any essentially transparent material made of glass and/or polymeric material (such as polycarbonate PC or polymethyl methacrylate PMMA). The carrier substrates and/or counter-substrates, that is to say the substrates framing the active system, may be rigid, flexible or semi-flexible.

This glazing may be used as glazing for buildings, glazing for automobiles, glazing for industrial or public transport railroad, maritime, aviation vehicles, in particular windows, wing mirrors, mirrors. This glazing has in particular a variable optical and/or energetic transmission and/or reflection, with the substrate or at least a part of the transparent or partially transparent substrate(s) made of plastic, preferably assembled as multiple and/or laminated glazing, or as double glazing.

The invention also relates to the various applications which may be found for these devices, glazing or mirrors: this may involve making glazing for buildings, particularly exterior glazing, interior partitions or glazed doors. It may also involve windows, roofs or interior partitions for means of transport such as trains, aircraft (for example a window), automobiles, boats. It may also involve visualization or display screens such as projection screens, television or computer screens, touch-sensitive screens commonly referred to as a "display". They may also be used to make spectacles or camera lenses, or alternatively to protect solar panels.

Figure 2:
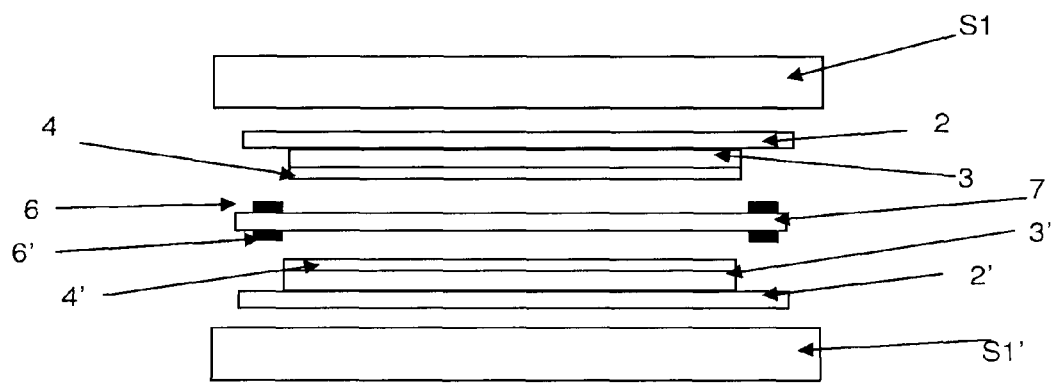

The invention will now be described in more detail with the aid of nonlimiting examples and figures:

FIG. 1: a schematic view in section of an electrochromic cell according to the invention, FIG. 2 illustrates a schematic view of FIG. 1 in section.

FIG. 1 is deliberately very schematic and is not necessarily to scale, in order to make it easier to read: it represents a section of an "all solid" electrochromic device according to the teachings of the invention, successively comprising:
- a substrate of clear silica-soda-lime glass S1 with a thickness of 2.1 mm,
- a lower electrically conductive layer 2 comprising a layer stack of the ITO/ZnO:Al/Ag/ZnO:Al/ITO type with respective thicknesses 15 to 20 nm for ITO/60 to 80 nm for ZnO:Al/3 to 15 nm for silver/60 to 80 nm for ZnO:Al/15 to 20 nm for ITO, or it is based on hot-deposited ITO (tin-doped indium oxide) measuring 500 nm,
- a first electrochromic system 3, the structure of which will be described below,
- an upper electrically conductive layer 4 based on ITO or $SnO_2$:F, or as a variant an upper electrically conductive layer comprising other conductive elements: this may more particularly involve associating the electrically conductive layer with a layer more conductive than it, and/or with a plurality of conductive strips or wires. For further details, reference may be made to Patent WO 00/57243 in respect of the implementation of such multi-component electrically conductive layers. A preferred embodiment of this type of electrically conductive layer consists in applying on the ITO layer (optionally covered with one or more other conductive layers) a network of conductive wires encrusted on the surface of a sheet 7 of polymer a sheet 7 acting as a laminating intermediate and making it possible to connect the upper electrically conductive layer associated with the first electrochromic stack and the upper electrically conductive layer associated with the second electrochromic stack to one of the current feeds, by means of a plurality of conductive strips, or one conductive strip, or conductive wires 6 an upper electrically conductive layer 4' identical in nature to the upper electrically conductive layer 4 connected to the current feeds 9 and 9',
- a second electrochromic system 3', the structure of which will be described below,
- a lower electrically conductive layer 2' similar in nature to the lower electrically conductive layer 2 connected to current feeds 10 and 10',
- a substrate of clear silica-soda-lime glass S1' with a thickness of 2.1 mm, The first and second electrochromic stacks 3 and 3' comprise:
- an anodic first layer EC1 of electrochromic material made of (hydrated) iridium oxide measuring 40 to 100 nm or optionally hydrated nickel oxide measuring 40 to 400 nm, optionally alloyed with other metals,
- a layer of tungsten oxide measuring 100 nm,
- a layer of hydrated tantalum oxide or hydrated silicon oxide or hydrated zirconium oxide measuring 100 nm, the latter two layers forming a layer EL with an electrolyte function,
- a cathodic second layer EC2 of electrochromic material based on tungsten oxide $WO_3$ measuring 370 nm, All these layers were deposited by magnetic field assisted cathodic sputtering. As a variant, it could be obtained by thermal evaporation or evaporation assisted with an electron beam, by laser ablation, by CVD optionally assisted with a plasma or with microwaves, or by an atmospheric pressure technique, in particular by depositing layers using sol-gel synthesis, in particular of the dip type, spray coating or roller coating.

The active stack 3 and/or 3' may be incised over some or all of its periphery by means of grooves made by mechanical means or by optionally pulsed laser radiation exposure, the intention being to limit the peripheral electrical leaks as is described in French Application FR-2 781 084.

The glazing represented in FIGS. 1, 2 furthermore incorporates (not represented in the figures) a first peripheral seal in contact with the faces 2 and 3 (2 and 3 being conventionally the numbering of the internal faces of the substrates S1 and S1'), this first seal being adapted to form a barrier against external chemical attack.

A second peripheral seal is in contact with the side edge of S1, the side edge of S1' and faces 1 and 4 (faces 1 and 4 being conventionally the numbering of the external faces of the substrates S1 and S1') so as to produce: a barrier, a means of assembly with the means of transport, a seal between the interior and the exterior, an aesthetic function, a means of incorporating reinforcement elements.

The electrochromic device described above constitutes Example 1.

The electrochromic device of this Example 1 was connected to an energy source so as to allow it to switch between a colored state and an uncolored state, and vice versa. The electrochromic stacks function optically in series on at least a portion of their surface. (As a variant, the electricity supply may be carried out in series or in parallel, but without affecting the optical functioning of the device in series).

The achieved contrast values will be given below for various stack configurations.

If an electrochromic device is supplied, the active systems 3 and 3' of which are respectively
- an anodic first layer EC1 of electrochromic material made of (hydrated) iridium oxide measuring 60 to 90 nm, preferably 85 nm,
- a layer of tungsten oxide measuring 100 nm,
- a layer of hydrated tantalum oxide, the latter 2 layers having an electrolyte function EL,
- a cathodic second layer EC2 of electrochromic material based on tungsten oxide $WO_3$ measuring 350 to 390 nm, preferably 380 nm, The stacks 3 and 3' are electrically separated and mechanically connected by a laminating insert 7 having electrical connection means on its surface.

Then switching of the glazing is obtained between an uncolored state having an Optical Transmission (OT) of 38% and a colored state having an OT of 0.01%. The contrast associated with this glazing is 3800.

In a second exemplary configuration,

The association on plastic substrates S1 and S1' made of PET, associated with an ITO layer with a thickness of 150 nm, of a first and a second electrochromic system 3 and 3' comprising:
- an anodic first layer EC1 of electrochromic material made of (hydrated) iridium oxide measuring 60 to 90 nm, preferably 85 nm,
- a layer of tungsten oxide measuring 100 nm,
- a layer of hydrated tantalum oxide, the latter two layers having an electrolyte function EL,
- a cathodic second layer EC2 of electrochromic material based on tungsten oxide $WO_3$ measuring 350 to 390 nm, preferably 380 nm, The stacks 3 and 3' are electrically separated and mechanically connected by a laminating insert 7 having electrical connection means on its surface.

Then switching of the glazing is obtained between an uncolored state having an Optical Transmission (OT) of 22% and a colored state having an OT of 0.04%. The contrast associated with this glazing is 550.

In a third exemplary configuration,

The association on glass substrates, coated with an $SnO_2$:F layer with a thickness of 6 nm, of a first and a second electrochromic system 3 and 3' comprising:
- an anodic first layer EC1 of electrochromic material made of (hydrated) nickel oxide measuring 180 to 250 nm, preferably 200 nm,
- a layer of optionally alloyed silicon nitride ($Si_3N_4$) or boron nitride or aluminum nitride, measuring 100 nm,
- a second layer of hydrated tantalum oxide, the latter two layers having an electrolyte function EL,
- a cathodic second layer EC2 of electrochromic material based on tungsten oxide $WO_3$ measuring 350 to 390 nm, preferably 380 nm, The stacks 3 and 3' are electrically separated and mechanically connected by a laminating insert 7 having electrical connection means on its surface.

Then switching of the glazing is obtained between an uncolored state having an Optical Transmission (OT) of 65% and a colored state having an OT of 4.5%. The contrast associated with this glazing is 14.

The invention claimed is:

1. An electrochemical/electrically controllable device having variable optical and/or energetic properties, comprising:
   - a first carrier substrate provided with an electrically conductive layer associated with a first stack of electrically active layers; and
   - a second carrier substrate provided with an electrically conductive layer associated with a second stack of electrically active layers, wherein
   - the first and second stacks each function optically in series on at least a portion of their surface and are separated by an electrically insulating means which is a gas, or is a vacuum.

2. The device as claimed in claim 1, wherein contrast values of the electrochromic device range between 9 and 10,000.

3. The device as claimed in claim 1, wherein contrast values of the electrochromic device range between 15 and 4,000.

4. An electrochromic glazing, comprising:
   - the electrochromic device as claimed in claim 1, having a variable optical and/or energetic transmission and/or reflection, with a substrate or at least a part of a transparent or partially transparent substrate(s) made of plastic, and the electrochromic glazing being assembled as multiple and/or laminated glazing, or as double glazing.

5. The electrochromic glazing as claimed in claim 4, wherein the electrochromic glazing is a glazing for buildings, glazing for automobiles, glazing for industrial or public transport railroad, a maritime glazing, a glazing for aviation vehicles, a glazing for windows, wing mirrors, mirrors, a display, a monitor, or a shutter for image acquisition devices.

6. The device as claimed in claim 1, wherein the first and second stacks are electrically supplied from the same supply.

7. The device as claimed in claim 6, wherein the first and second stacks are electrically supplied in series.

8. The device as claimed in claim 6, wherein the first and second stacks are electrically supplied in parallel.

9. The device as claimed in claim 1, wherein the first stack and the second stack are "all solid" electrochromic stacks with a TC1/EC1/EL/EC2/TC2 structure.

10. The device as claimed in claim 9, wherein the layer EL with an electrolyte function includes at least one layer based on a material selected from tantalum oxide, tungsten oxide, molybdenum oxide, antimony oxide, niobium oxide, chromium oxide, cobalt oxide, titanium oxide, tin oxide, nickel oxide, oxide of zinc, oxide of zinc alloyed with aluminum, zirconium oxide, aluminum oxide, oxide of silicon, oxide of silicon alloyed with aluminum, silicon nitride, silicon nitride alloyed with aluminum or boron, boron nitride, aluminum nitride, oxide of vanadium, oxide of vanadium alloyed with aluminum, and oxide of tin and zinc.

11. The device as claimed in claim 9, wherein the electrically conductive layer TC1 or TC2 is of the metallic type or of the TCO (transparent conductive oxide) type made of $In_2O_3$:Sn (ITO), $SnO_2$:F, ZnO:Al, or is a multiple layer of the TCO/metal/TCO type, this metal being selected in particular from silver, gold, platinum, copper, or a multiple layer of the NiCr/metal/NiCr type, the metal likewise being selected from silver, gold, platinum, copper.

12. The device as claimed in claim 9, wherein an oxide of the layer EL with an electrolyte function is hydrogenated or nitrided.

13. The device as claimed in claim 9, wherein each electrically active layer EC1 or EC2 includes at least one of the following compounds: oxide of tungsten W, niobium Nb, tin Sn, bismuth Bi, vanadium V, nickel Ni, iridium Ir, antimony Sb, tantalum Ta, individually or as a mixture.

14. The device as claimed in claim 13, wherein each electrically active layer EC1 or EC2 includes titanium, rhenium, or cobalt.

15. A method for fabricating an electrochemical device, the method comprising:
   - providing a first carrier substrate provided with an electrically conductive layer associated with a first stack of electrically active layers;
   - providing a second carrier substrate provided with an electrically conductive layer associated with a second stack of electrically active layers, wherein the first and second stacks each function optically in series on at least a portion of their surface and are separated by an electrically insulating means which is a gas, or is a vacuum; and
   - depositing at least one of the layers of the electrochemical device by cathodic sputtering, cathodic sputtering assisted with a magnetic field, thermal evaporation, evaporation assisted with an electron beam, laser ablation, CVD, CVD assisted with a plasma or microwaves, an atmospheric pressure technique, or sol-gel synthesis of a dip type, spray, coating, or roller coating.

* * * * *